United States Patent [19]
Marino

[11] Patent Number: 6,045,429
[45] Date of Patent: Apr. 4, 2000

[54] TURKEY CALL

[76] Inventor: Henry Marino, 612 S. 4th St., Youngwood, Pa. 15697

[21] Appl. No.: 09/047,244

[22] Filed: Mar. 24, 1998

[51] Int. Cl.$^7$ ....................................................... A63H 5/00
[52] U.S. Cl. ............................................ 446/207; 446/209
[58] Field of Search ................................... 446/202, 207, 446/204, 208

[56] References Cited

U.S. PATENT DOCUMENTS

| | | | |
|---|---|---|---|
| 2,317,458 | 4/1943 | Herter | 446/207 |
| 2,833,086 | 5/1958 | Johenning . | |
| 3,001,322 | 9/1961 | Sanders | 446/207 |
| 3,583,094 | 6/1971 | Tribell . | |
| 3,738,056 | 6/1973 | Schultz . | |
| 4,940,451 | 7/1990 | Leady | 446/207 |
| 4,988,325 | 1/1991 | Alderson et al. . | |
| 5,577,946 | 11/1996 | Oathout | 446/207 |

*Primary Examiner*—Sam Rimell
*Assistant Examiner*—Laura Fossum
*Attorney, Agent, or Firm*—Jon M. Lewis, Esquire

[57] ABSTRACT

A mouth blown turkey call is provided with a wooden housing dimensioned with a mouth piece at a distal end and an output void at a proximal end. The housing is divided into a top and bottom. Air flows through a top and bottom first air chamber, past a reed seated in a top and bottom reed chamber, and through a top and bottom resonance chamber before it leaves the housing through a top and bottom second air chamber and output void. Turkey calls are generated by a person blowing into said mouth piece which stimulates the reed. By varying the air pressure applied, various mimicking turkey sounds are produced.

2 Claims, 2 Drawing Sheets

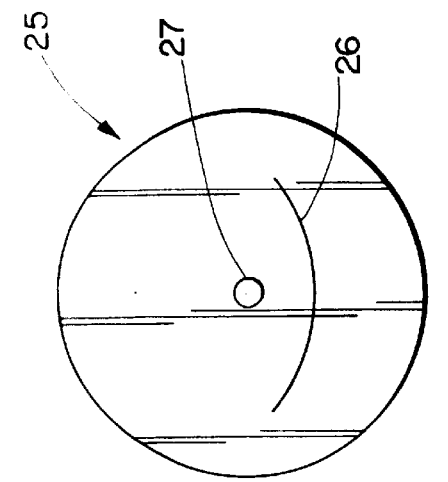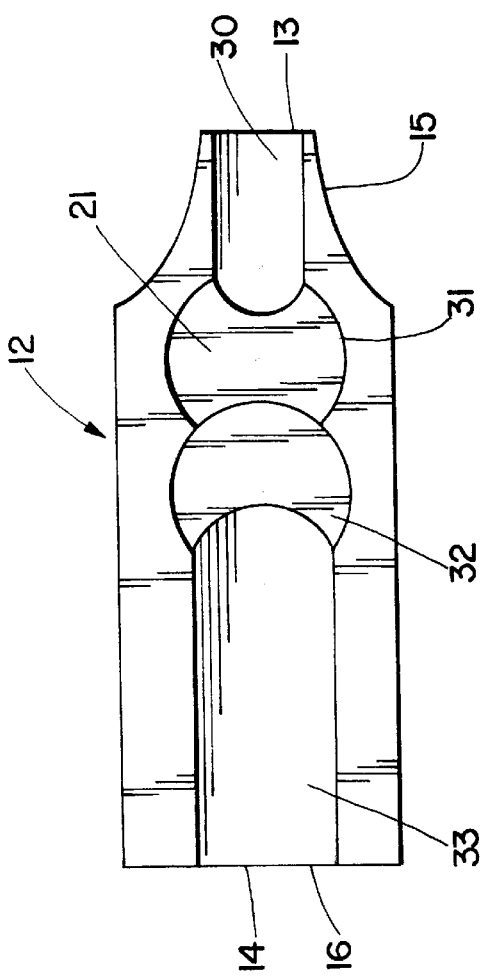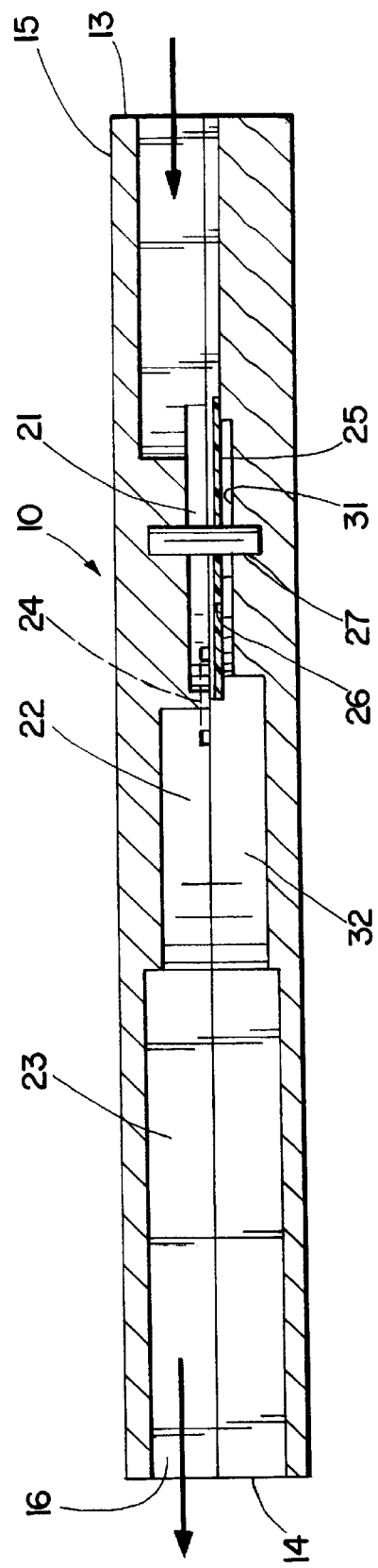

TURKEY CALL

BACKGROUND OF INVENTION

1. Field of Invention

This invention relates to a device which generates the sounds of wild turkey by use of a mouth blown call. The sounds made by my invention accurately simulate the prey so that they will be prone to approach the hunter generating the sounds. When a person manipulates the amount of air pressure applied to the mouth chamber, a desired variety of turkey sounds are produced.

2. Description of the Prior Art

Turkey calls are well known in the art and improvements in the assembly and materials used have allowed the invention of novel turkey sound producing instruments. The turkey calls of the prior art generally allow the production of different turkey sounds. There are well known calls known to many turkey hunters, which in use make numerous noises which male and female turkeys understand. Various calls work in different ways to produce appropriate turkey sounds. Additionally there are many well known calls which are available in the prior art. For example, in U.S. Pat. No. 2,833,086, a turkey call is shown wherein a complex breath activated box to shape caller is used to accurately simulate the sounds of a turkey. However, the complexity of this design requires maintenance and is believed not to work as well as the claimed invention in long use. U.S. Pat. No. 3,583,094 is another breath activated game caller which also requires maintenance on the part of the user and is believed not to provide as many distinctive variety of sounds in the manner of the claimed invention. A further breath activated call is described in the Shultz U.S. Pat. No. 3,738,056 which requires maintenance in the field. U.S. Pat. No. 4,988,325 to Alderson et al. likewise describes a turkey call. However, the Alderson et al. invention is not breath activated and requires two hands for use. This is an impediment if the device is being used to attract turkeys while hunting.

My invention overcomes many disadvantages of the prior art designs because my turkey call produces consistent desired turkey call sounds without maintenance, adjusting, tightening, or disassembly. Additionally, my invention is easy and inexpensive to manufacture, produces the wide variety of calls necessary to attract the prey with little practice or training, and may be used with one or two hands free. The advantage with a hands free call would be obvious to most turkey hunters. The calls made by judicious use of my invention to call turkeys include but are not limited to the whine, cluck, purr, yelp, and cutting.

SUMMARY OF INVENTION

It is an objection of my invention to provide a mouth blown turkey call which produces consistent sounds without maintenance by utilizing the housing having a series chambers with a reed seated in one of the chambers.

It is another object of the present invention to provide a mouth blown turkey call that can be used with one or two hands free.

It is a still further object of the present invention to provide a mouth blown turkey call that makes various advantageous sounds that are pleasing to turkeys.

DESCRIPTION OF THE DRAWINGS

FIG. 3 is an inside view of the bottom of my invention.

FIG. 4 is a horizontal view of a reed of my invention.

FIG. 5 is a sectional view taken along line 5—5 of FIG. 1.

DETAILED DESCRIPTION OF THE DRAWINGS

Figure 1:
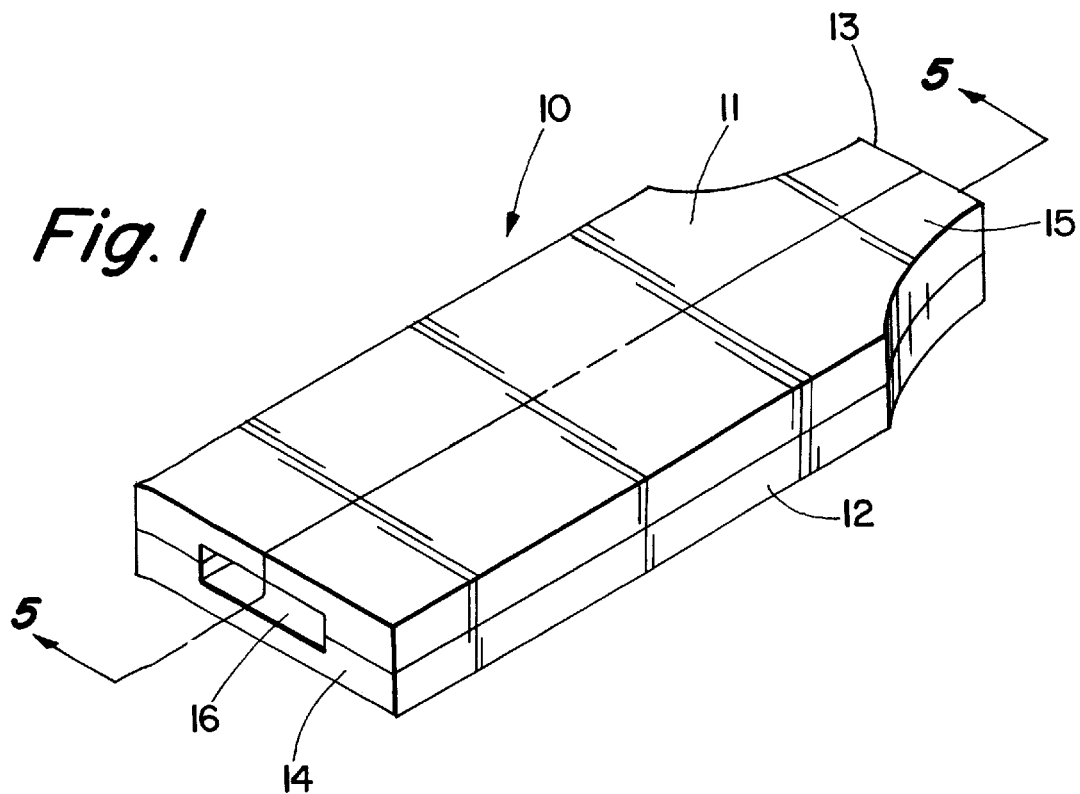
FIG. 1 is a perspective elevational view of a mouth blown turkey call of my invention.

As shown in the view disclosed in FIG. 1, a housing 10 is provided with a top 11 and bottom 12; and a distal end 13 and proximal end 14. A mouth piece 15 is dimensioned at the distal end 13 and output void 16 is dimensioned at the proximal end 14 as appears in FIGS. 2, 3, and 5.

Figure 2:
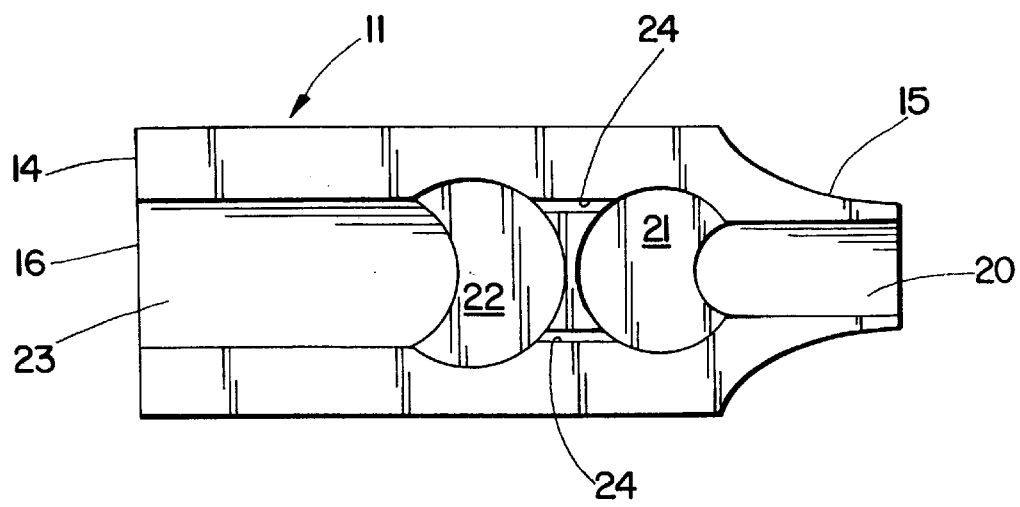
FIG. 2 is an inside view of a top of my invention.

Referring to FIG. 2, a top 11 is disclosed having a top first air chamber 20 that leads from the mouth piece 15. A top reed chamber 21 is connected to the top air chamber. A vapor slot 24 is placed in the housing to lead from the top reed chamber to a top resonance chamber 22. A top second air chamber 23 leads from the resonance chamber to the output void 16 located at the proximal end 14 of housing 10.

FIG. 3 discloses a bottom 12 of housing 10 having a bottom first air chamber 30 leading from the mouth piece 15 at the distal end 13 to a bottom reed chamber 31. A bottom resonance chamber 32 is dimensioned within the housing and cuts into the bottom reed chamber 31. Bottom second air chamber 33 leads from the bottom resonance chamber to output void 16 located at the proximal end 14 of housing 10.

A reed 25 as disclosed in FIG. 4. Said reed is preferably circular in shape and dimensioned with a central slit 26. A pin 27 is shown to fit within reed 25.

Referring to FIG. 5, reed 25 is seated between top reed chamber 21 and bottom reed chamber 31. Pin 27 is dimensioned to go through the reed 25 and depressed into both the top reed chamber 21 and bottom reed chamber 31 to hold the same in place. In operation as can be considered by looking through FIG. 5, air would flow through the mouth piece 15 dimensioned at the distal end 13 of housing 10. The air would be divided into two portions at the location of the reed 25. One portion of air passes over the reed through top reed chamber 21, vapor slot 24, top resonance chamber 22, top second air chamber 23, and out the output void 16 located at the proximal end 14 of housing 10. Another portion of air then flows under reed 25 through bottom reed chamber 31, bottom resonance 32, and out bottom second air chamber through output void 16 located at the proximal end 14 of housing 10. The reed 25 with its' central slit 26 modulates the air to make sound pleasing to turkeys in use.

In the preferred embodiment, the reed is made of a Mylar® film and coated with a waterproof coating such as Rustoleum®.

In the preferred embodiment, it is also found in use that the top reed chamber 21 and bottom reed chamber 31 as disclosed in FIG. 5 are placed on center. The top reed chamber is preferred to be larger than bottom reed chamber to help seat the reed and keep it in place. Two vapor slots 24 are preferred in the desired embodiment. The bottom resonance chamber 32 and top resonance chamber 22 are off set so that the bottom resonance chamber 32 cuts into the bottom reed chamber 31. The sound produced by such arrangement seems to be pleasing to turkeys.

The preferred embodiment, as illustrated in FIGS. 1, 2, and 3, should be made of wood such as cedar. The housing is ½" thick having a top of a ¼" and bottom of a ¼.

The mouth piece 15 is preferred to be ½" wide, ³⁄₁₆" deep.

The top first air chamber and bottom first air chamber are preferred to be ⁵⁄₁₆" long, ³⁄₁₆ deep, and ½" wide. The top reed chamber 21 and bottom reed chamber 31 defined themselves to be preferably ⅞" in diameter, ¹⁄₁₆" deep, and centered 1 and ¼" from the mouth piece 15.

The vapor slots are preferred to be ¹⁄₁₆" wide and ¹⁄₁₆" deep. The top resonance chamber 22 is preferred to be 1" wide, ⁵⁄₃₂" deep, and a center 2¼" from the mouth piece 15.

The bottom reed chamber is preferred to be slightly smaller in diameter than the top reed chamber and of the same dimensions. The bottom resonance chamber is preferred to be 1" in diameter, ⁵⁄₃₂ in depth, and is centered 2" from mouth piece. Top second air chamber and bottom second air chamber are preferred to be dimensioned similarly at ¾" wide, ³⁄₁₆ deep, and approximately 1¾" long.

It is preferred that reed 25 be of 1" in diameter, 3 mm thick. Central slit 26 as disclosed in FIG. 4 is substantially preferred to be ³⁄₁₆" from the edge on both sides and is curved so at a minimum distance from the edge is ⁵⁄₁₆". It is preferred to be made of plastic Mylar® drafting film and is painted with two coats of Rustoleum® paint. In use, a person who places their mouth at the mouth piece 15 and blows air into my invention to make sounds pleasing to turkeys.

While certain specific details have been disclosed herein, it is not intended to limit this invention to the precise details disclosed since various changes and modifications will suggest themselves to anyone skilled in the art who may read this Specification.

What is claimed as new is as follows:

1. A mouth blown turkey call comprising:

a housing with a distal end and a proximal end divided into a top and a bottom;

a mouth piece dimensioned in the distal end and an output void dimensioned at the proximal end;

said top dimensioned with a first top air chamber leading from the mouth piece to a top reed chamber, a top resonance chamber placed towards the proximal end, a vapor slot placed between said top reed chamber and said top resonance chamber, and a top second air chamber leading to said output void;

said bottom dimensioned with a bottom first air chamber leading from the mouth piece to a bottom reed chamber, a bottom resonance chamber that communicates with the bottom reed chamber, and a bottom second air chamber connected to the bottom reed chamber and to said output void; and a reed having a central slit placed between the top reed chamber and bottom reed chamber with a pin dimensioned to fit through the reed and placed into the top and bottom about the locations of the top reed chamber and bottom reed chamber.

2. The turkey call of claim 1 further comprising:

said top resonance chamber, top reed chamber, bottom reed chamber and bottom resonance chamber are circular;

said reed chamber and bottom reed chamber are dimensioned so that they fit over each other; and said top resonance chamber and said bottom resonance chamber are offset so that in use air flows from the mouth piece to the first top air chamber and first bottom air chamber and is divided into a portion that passes above the reed through the top reed chamber, vapor slot and top resonance chamber and out the top second air chamber and another portion passes under the reed through the bottom reed chamber, bottom resonance chamber, and out the bottom second air chamber.

\* \* \* \* \*